(12) United States Patent
Peachee et al.

(10) Patent No.: US 7,012,350 B2
(45) Date of Patent: Mar. 14, 2006

(54) SEGMENTED STATOR SWITCHED RELUCTANCE MACHINE

(75) Inventors: C. Theodore Peachee, St. Louis, MO (US); Donald J. Williams, Pierron, IL (US); James A. Wafer, Belleville, IL (US); Marielle Piron, Harrogate (GB); Steven P. Randall, Adel (GB); Richard S. Wallace, Jr., Ferguson, MO (US); Michael L. McClelland, Calverly (GB)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/803,876

(22) Filed: Mar. 12, 2001

(65) Prior Publication Data

US 2002/0125782 A1 Sep. 12, 2002

(51) Int. Cl.
*H02K 17/00* (2006.01)
*H02K 1/12* (2006.01)

(52) U.S. Cl. ...................... 310/166; 310/68 B; 310/254
(58) Field of Classification Search ................ 310/166, 310/258, 259, 254; 300/68 B
See application file for complete search history.

(56) References Cited

U.S. PATENT DOCUMENTS

| 1,756,672 A | 4/1930 | Barr ............................ 310/29 |
| 2,688,103 A | 8/1954 | Sheldon ...................... 310/254 |
| 2,894,157 A | 7/1959 | Morrill ........................ 310/79 |
| 3,604,222 A | 9/1971 | Sandkrug et al. |
| 3,914,859 A | 10/1975 | Pierson |
| 3,979,821 A | 9/1976 | Noodleman |
| 3,987,324 A | * 10/1976 | Linkous ...................... 310/197 |
| 4,130,770 A | 12/1978 | Wrobel |

(Continued)

FOREIGN PATENT DOCUMENTS

| DE | 2937838 A1 | 9/1979 |
| EP | 0350429 | 1/1990 |
| EP | 0823711 A1 | 2/1998 |
| EP | 0778660 A3 | 9/1998 |
| EP | 0868010 A1 | 9/1998 |

(Continued)

OTHER PUBLICATIONS

G. Gallegos–Lopez, P.C. Kjaer, T.J.E. Miller, "A New Rotor Position Estimation Method For Switched Reluctance Motors Using PWM Voltage Control", in Proc EPE'97, 7th European Conf. on Power Electronics and Applications Sep. 8–10, 1997 Trondheim Norway vol. 3 pp. 580–585.
Stephenson/Blake, "The Characteristics, Design and Applications of Switched Reluctance Motors and Drives", presented at the PCIM '93 Conference and Exhibition at Nuremberg, Germany, Jun. 21–24, 1993.

(Continued)

*Primary Examiner*—Darren Schuberg
*Assistant Examiner*—Julio Gonzalez Ramirez
(74) *Attorney, Agent, or Firm*—Harness, Dickey & Pierce, P.L.C.

(57) ABSTRACT

A switched reluctance machine includes a stator with a plurality of circumferentially-spaced stator segment assemblies that include salient stator poles and inter-polar stator slots. Each of the stator segment assemblies includes a stack of stator plates forming a stator segment core, an end cap assembly, and winding wire wound around the stator segment core and the end cap assembly. The rotor defines a plurality of rotor poles. The rotor tends to rotate relative to the stator to maximize the inductance of an energized winding. A drive circuit energizes the winding wire around the stator segment assemblies based on a rotational position of the rotor. Each stator plate includes a first radially outer rim section and a tooth section that extends radially inwardly from a first center portion of the first radially outer rim section.

13 Claims, 5 Drawing Sheets

U.S. PATENT DOCUMENTS

| | | | |
|---|---|---|---|
| 4,149,309 A | 4/1979 | Mitsui .......................... 29/596 |
| 4,340,829 A | 7/1982 | McCoy |
| 4,350,914 A | 9/1982 | Searle ......................... 310/194 |
| 4,418,307 A | 11/1983 | Hoffmann et al. |
| 4,584,495 A * | 4/1986 | Kordik ..................... 310/49 R |
| 4,635,349 A | 1/1987 | Rabe ........................... 29/596 |
| 4,698,542 A | 10/1987 | Muller |
| 4,772,839 A | 9/1988 | MacMinn et al. |
| 4,812,695 A | 3/1989 | Parshall |
| 4,819,460 A | 4/1989 | Obradovic |
| 4,845,837 A | 7/1989 | Lloyd |
| 4,883,982 A | 11/1989 | Forbes et al. |
| 4,896,089 A | 1/1990 | Kliman et al. |
| 4,922,165 A * | 5/1990 | Crawford et al. ........... 310/215 |
| 4,950,932 A | 8/1990 | Harms et al. |
| 4,953,284 A | 9/1990 | Hammer et al. |
| 4,959,596 A | 9/1990 | MacMinn et al. |
| 4,998,052 A | 3/1991 | Erdman et al. |
| 5,034,642 A | 7/1991 | Hoemann et al. |
| 5,076,076 A | 12/1991 | Payne |
| 5,161,393 A | 11/1992 | Payne et al. |
| 5,173,650 A | 12/1992 | Hedlund |
| 5,194,775 A * | 3/1993 | Cooper ........................ 310/260 |
| 5,212,419 A | 5/1993 | Fisher et al. ................ 310/254 |
| 5,252,902 A | 10/1993 | Uehara et al. |
| 5,256,926 A | 10/1993 | Hagenlocher et al. ...... 310/259 |
| 5,257,828 A | 11/1993 | Miller et al. |
| 5,301,523 A | 4/1994 | Payne et al. |
| 5,325,677 A | 7/1994 | Payne et al. |
| 5,327,053 A | 7/1994 | Mann et al. |
| 5,410,235 A | 4/1995 | Ehsani ........................ 318/701 |
| 5,457,375 A | 10/1995 | Marcinkiewicz et al. |
| 5,467,025 A | 11/1995 | Ray |
| 5,491,859 A | 2/1996 | Richardson |
| 5,563,463 A | 10/1996 | Stark |
| 5,578,880 A | 11/1996 | Lyons et al. |
| 5,583,387 A * | 12/1996 | Takeuchi et al. ..... 174/DIG. 20 |
| 5,589,751 A | 12/1996 | Lim |
| 5,672,925 A * | 9/1997 | Lipo et al. ............. 310/154.11 |
| 5,691,591 A | 11/1997 | McCann ..................... 310/198 |
| 5,701,064 A | 12/1997 | Horst et al. |
| 5,720,065 A | 2/1998 | Myers et al. |
| 5,729,072 A | 3/1998 | Hirano et al. ............... 310/258 |
| 5,740,880 A | 4/1998 | Miller |
| 5,743,721 A | 4/1998 | Graham et al. |
| 5,763,978 A * | 6/1998 | Uchida et al. ............... 310/156 |
| 5,777,416 A | 7/1998 | Kolomeitsev |
| 5,783,916 A | 7/1998 | Blackburn .................. 318/254 |
| 5,786,651 A | 7/1998 | Suzuki |
| 5,793,179 A | 8/1998 | Watkins |
| 5,806,169 A | 9/1998 | Trago et al. |
| 5,811,905 A * | 9/1998 | Tang ........................... 310/162 |
| 5,821,661 A | 10/1998 | Wissmach et al. |
| 5,859,518 A | 1/1999 | Vitunic |
| 5,877,568 A | 3/1999 | Maes et al. |
| 5,883,485 A | 3/1999 | Mehlhorn |
| 5,923,141 A | 7/1999 | McHugh |
| 5,929,590 A | 7/1999 | Tang |
| 5,949,211 A | 9/1999 | McCann ..................... 318/701 |
| 5,955,861 A | 9/1999 | Jeong et al. |
| 5,979,195 A | 11/1999 | Bestell et al. |
| 5,982,117 A | 11/1999 | Taylor et al. |
| 5,990,592 A * | 11/1999 | Miura et al. ................ 310/156 |
| 5,994,804 A | 11/1999 | Grennan et al. |
| 5,996,379 A | 12/1999 | Skrippek |
| 6,011,368 A | 1/2000 | Kalpathi et al. |
| 6,020,661 A * | 2/2000 | Trago et al. ................... 310/43 |
| 6,040,647 A | 3/2000 | Brown et al. |
| 6,041,625 A | 3/2000 | Nagai et al. |
| 6,049,153 A | 4/2000 | Nishiyama et al. |
| 6,066,905 A | 5/2000 | Wright et al. ............... 310/179 |
| 6,081,083 A | 6/2000 | Nashiki |
| 6,087,755 A | 7/2000 | Suzuki et al. |
| 6,092,619 A | 7/2000 | Nishikawa et al. |
| 6,102,151 A | 8/2000 | Shimizu et al. |
| 6,104,113 A | 8/2000 | Beifus |
| 6,107,772 A | 8/2000 | Liu et al. |
| 6,122,579 A | 9/2000 | Collier-Hallman et al. |
| 6,127,753 A | 10/2000 | Yamazaki et al. |
| 6,144,131 A * | 11/2000 | Hollenbeck et al. ......... 310/156 |
| 6,166,468 A | 12/2000 | Suzuki et al. |
| 6,177,751 B1 | 1/2001 | Suzuki et al. |
| 6,188,196 B1 * | 2/2001 | Koide et al. ................. 318/700 |
| 6,194,805 B1 | 2/2001 | Heese et al. |
| 6,194,806 B1 * | 2/2001 | Suzuki et al. ............... 310/216 |
| 6,204,579 B1 | 3/2001 | Arpino ......................... 310/43 |
| 6,211,587 B1 | 4/2001 | Enomoto et al. ............. 310/52 |
| 6,218,753 B1 * | 4/2001 | Asano et al. ................ 310/156 |
| 6,219,900 B1 * | 4/2001 | Suzuki ........................ 100/291 |
| 6,226,856 B1 | 5/2001 | Kazama et al. |
| 6,239,530 B1 | 5/2001 | Garcia |
| 6,252,325 B1 | 6/2001 | Nashiki ....................... 310/168 |
| 6,266,591 B1 | 7/2001 | Wilson-Jones et al. |
| 6,300,700 B1 | 10/2001 | Nishiyama et al. |
| 6,329,782 B1 | 12/2001 | Chen et al. |
| 6,359,412 B1 * | 3/2002 | Heglund ...................... 318/701 |
| 6,369,481 B1 | 4/2002 | Bahn |
| 6,369,687 B1 * | 4/2002 | Akita et al. .................. 310/216 |
| 6,373,211 B1 | 4/2002 | Henry et al. |
| 6,384,564 B1 | 5/2002 | Pollock ....................... 318/701 |
| 6,389,678 B1 | 5/2002 | Ackermann et al. .......... 29/596 |
| 6,411,006 B1 | 6/2002 | Suzuki et al. ............... 310/254 |
| 6,487,769 B1 | 12/2002 | Ketterer et al. |
| 2001/0010452 A1 | 8/2001 | Moriarty |
| 2001/0030517 A1 * | 10/2001 | Batzel ......................... 318/254 |
| 2002/0089251 A1 | 7/2002 | Tajima et al. |

FOREIGN PATENT DOCUMENTS

| | | |
|---|---|---|
| EP | 0871282 A1 | 10/1998 |
| EP | 0967135 A2 | 12/1999 |
| FR | 2719324 | 11/1995 |
| GB | 1200279 | 7/1970 |
| JP | 61030938 | 2/1986 |
| JP | 404049826 A * | 2/1992 |
| JP | 05-038086 | 2/1993 |
| JP | 08-033292 | 2/1996 |
| JP | 09084282 | 3/1997 |
| JP | 09-233742 | 9/1997 |
| JP | 09-322439 | 12/1997 |
| JP | 10-174319 | 6/1998 |
| JP | 10-210721 | 7/1998 |
| JP | 10-271718 | 10/1998 |
| JP | 11-018331 | 1/1999 |
| JP | 11-089129 | 3/1999 |
| JP | 11-191987 | 7/1999 |
| JP | 11-275830 | 10/1999 |
| JP | 11-289701 | 10/1999 |
| JP | 11-289726 | 10/1999 |
| JP | 11-289727 | 10/1999 |
| JP | 11-289728 | 10/1999 |
| JP | 411289701 A * | 10/1999 |
| JP | 11-332138 | 11/1999 |
| JP | 11-341717 | 12/1999 |
| JP | 2000-014057 | 1/2000 |
| JP | 2000-37050 | 2/2000 |
| JP | 2000-139052 | 5/2000 |
| JP | 2000-224790 | 8/2000 |
| JP | 2000-312451 | 11/2000 |
| JP | 2000-333388 | 11/2000 |
| JP | 2001-008395 | 1/2001 |
| RU | 1354338 A1 | 11/1987 |
| WO | WO 00/37731 | 6/2000 |
| WO | WO 00/79670 A1 | 12/2000 |
| WO | WO 01/95459 A1 | 12/2001 |

OTHER PUBLICATIONS

T.J.E. Miller, "Switched Reluctance Motors and Their Control", Magna Physics Publishing and Claredon Press Oxford 1993.

WF Ray and IH Al–Bahadly, "Sensorless Methods for Determining the Rotor Position of Switched Reluctance Motors", published in the Proceedings of the European Power Electronics Conference, Brighton UK Sep. 13–16, 1993 vol. 6, pp. 7–13.

Gallegos–Lopez/Kjaer/Miller, "A New Sensorless Method for Switched Reluctance Motor Drives", 1997, Department of Electronics and Electrical Engineering, p. 564–570.

Mvungi/Stephenson, "Accurate Sensorless Rotor Position Detection In An SR Motor", 1991, p. 76–79.

Anthony J. Chanpagne, "Correlation of Electric Power Steering Vibration to Subjective Ratings", Mar. 6–9, 2000, SAE Technical Paper Series 200–01–0817, p. 1–3.

Toboldt/Johnson/Olive, "Goodheart–Willcox Automotive Encyclopedia", 1989, p. 577–584.

Roy McCann, "Variable Effort Steering for Vehicle Stability Enhancement Using An Electric Power Steering System", Mar. 6–9, 2000, SAE Technical Paper Series 200–01–0817, p. 1–5.

* cited by examiner

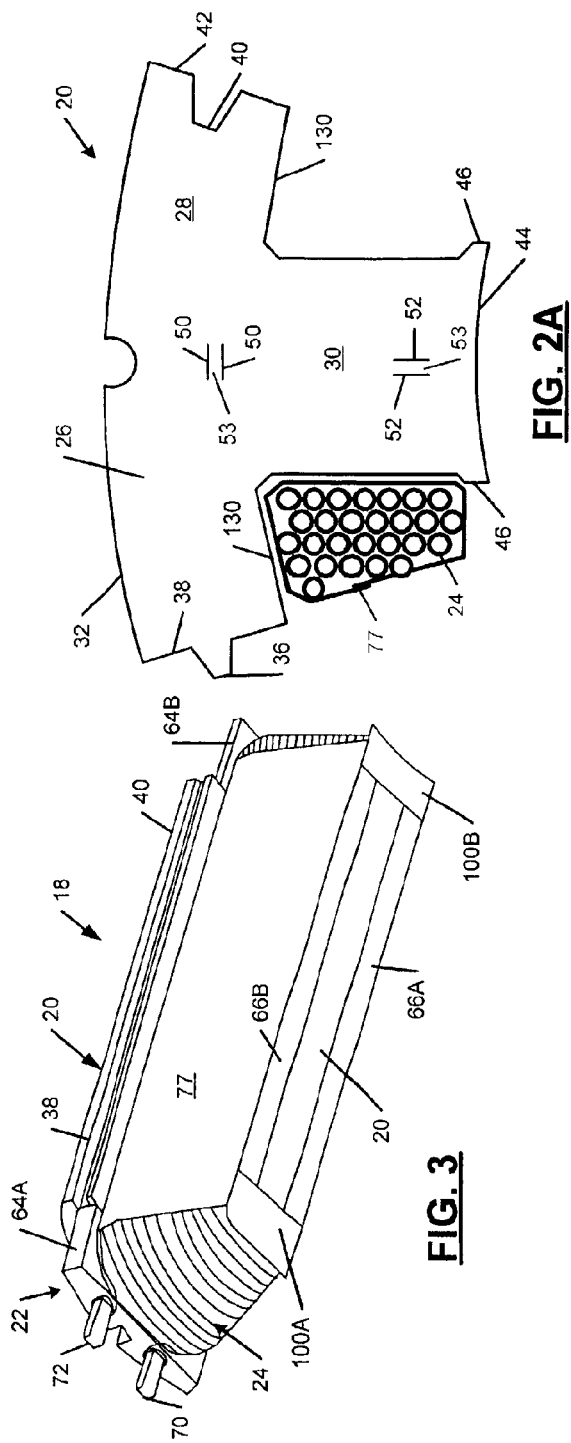
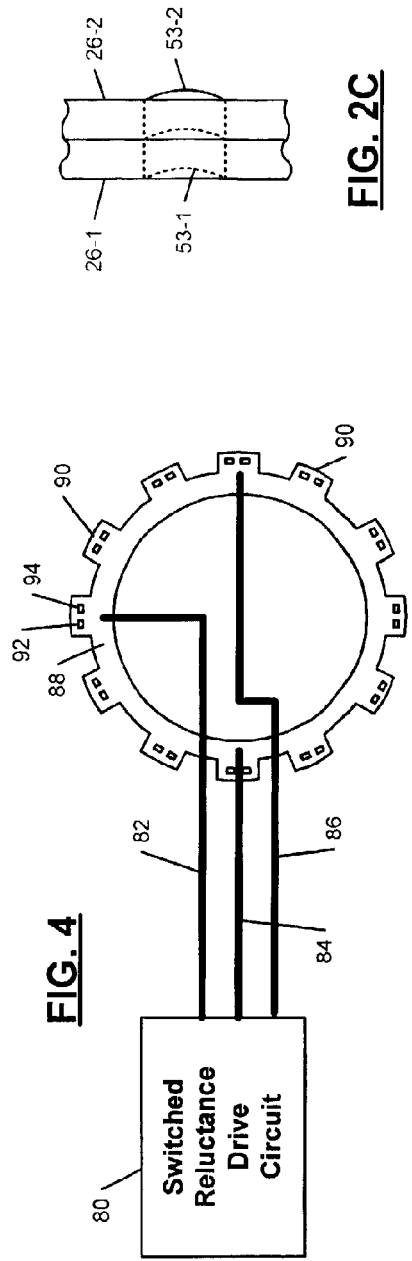

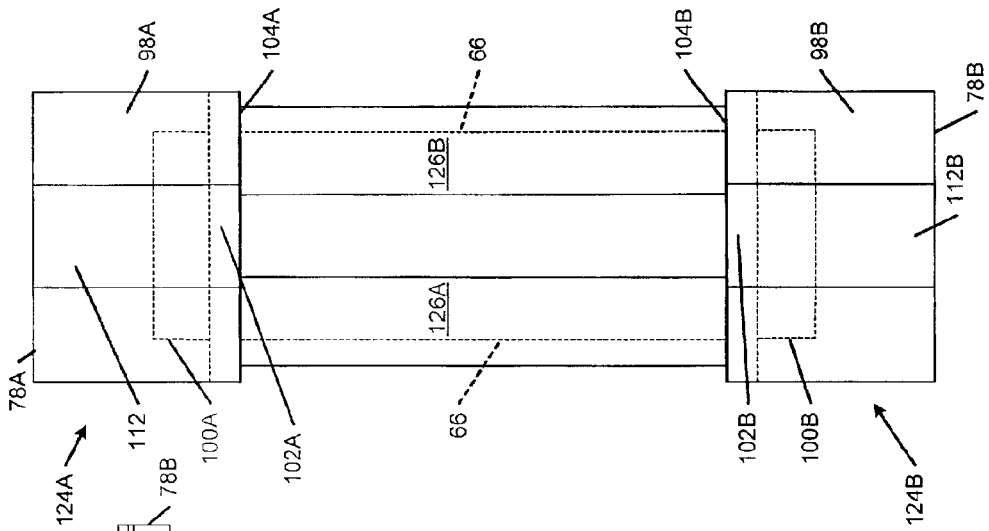
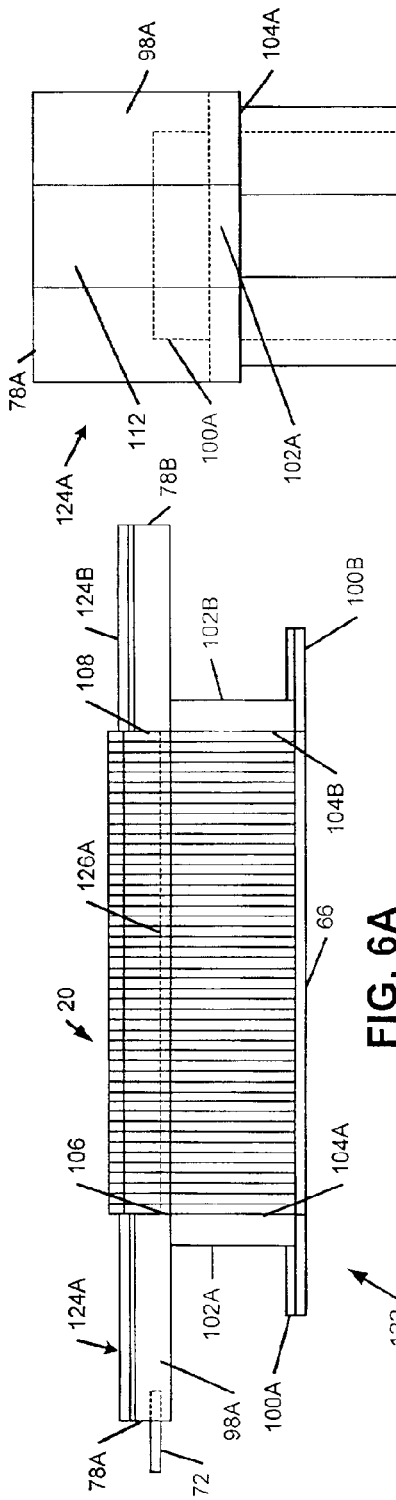
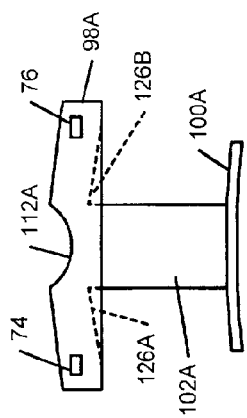

SEGMENTED STATOR SWITCHED RELUCTANCE MACHINE

FIELD OF THE INVENTION

This invention relates to electric machines and, more particularly, to a switched reluctance electric machine including a segmented stator.

BACKGROUND OF THE INVENTION

Reluctance electric machines, such as motors and generators, typically include a stator that is mounted inside a machine housing and a rotor that is supported for rotation relative to the stator. Reluctance electric machines produce torque as a result of the rotor tending to rotate to a position that minimizes the reluctance of the magnetic circuit and maximizes the inductance of an energized winding of the stator. A drive circuit generates a set of stator winding currents that are output to stator pole windings and that produce a magnetic field. In response to the magnetic field, the rotor rotates in an attempt to maximize the inductance of the energized winding of the stator.

In synchronous reluctance electric machines, the windings are energized at a controlled frequency. Control circuitry and/or transducers are provided for detecting the angular position of the rotor. A drive circuit energizes the stator windings as a function of the sensed rotor position. The design and operation of sensorless switched reluctance electric machines is known in the art and is discussed in T. J. E. Miller, "Switched Reluctance Motors and Their Control", Magna Physics Publishing and Clarendon Press, Oxford, 1993, which is hereby incorporated by reference.

Conventional switched reluctance electric machines generally include a stator with a solid stator core or a laminated stator with a plurality of circular stator plates that are punched from a magnetically conducting material and that are stacked together. The stator plates define salient stator poles that project radially inward and inter-polar slots that are located between the adjacent stator poles. The stator typically includes pairs of diametrically opposed stator poles. The rotor also typically includes pairs of diametrically opposed rotor poles. Windings or coils are wound around the stator poles. The windings that are wound around the pairs of diametrically opposed stator poles are connected to define a phase coil.

By providing current in the phase coil, magnetic fields are established in the stator poles that attract a pair of the rotor poles. The current in the phase coils is generated in a predetermined sequence in order to produce torque on the rotor. The period during which current is provided to the phase coil, while the rotor poles are brought into alignment with the stator poles, is known as the active stage of the phase coil.

At a predetermined point, either as the rotor poles become aligned with the stator poles or at some point prior thereto, the current in the phase coil is commutated to prevent a negative torque from acting on the rotor poles. Once the commutation point is reached, current is no longer output to the phase coil and the current is allowed to dissipate. The period during which current is allowed to dissipate is known as the inactive stage.

In order to maintain torque on the rotor, to thereby optimize machine efficiency, it is important to maintain the relationship between the position of the rotor and the active stage of each phase coil. If the active stage is initiated and/or commutated too early or too late with respect to the position of the rotor, a constant torque on the rotor will not be maintained and the machine will not operate at an optimum efficiency. Conventional switched reluctance electric machines attempt to maintain the relationship between the active stages of the phase coils and the position of the rotor by continuously sensing rotor position.

There are two distinct approaches for detecting the angular position of the rotor. In a "sensed" approach, an external physical sensor senses the angular position of the rotor. For example, a rotor position transducer (RPT) with a hall effect sensor or an optical sensor physically senses the angular position of the rotor. In a "sensorless" approach, electronics that are associated with the drive circuit derive the angular rotor position without an external physical sensor. For example, the rotor position can be derived by measuring the back electromotive force (EMF) in an unenergized winding. In U.S. Pat. Nos. 6,107,772, 6,011,368 to Kalpathi et al, U.S. Pat. No. 5,982,117 to Taylor et al, U.S. Pat. No. 5,929,590 to Tang et al, U.S. Pat. No. 5,883,485 to Mehlhorn, U.S. Pat. No. 5,877,568 to Maes et al, U.S. Pat. No. 5,777,416 to Kolomeitsev, and U.S. Pat. No. 4,772,839 to MacMinn, which are hereby incorporated by reference, a drive circuit estimates the rotor position from the inductance of the phase coil.

Another sensorless approach outputs diagnostic pulses to the unenergized windings and senses the resulting electrical response. For example, in U.S. Pat. No. 4,959,596 to MacMinn, et al., and U.S. Pat. No. 5,589,518 to Vitunic, which are hereby incorporated by reference, a drive circuit employs voltage sensing pulses that are output to an inactive phase coil.

In switched reluctance electric machines using the "sensed" approach, the RPT detects the angular position of the rotor with respect to the stator. The RPT provides an angular position signal to the drive circuit that energizes the windings of the switched reluctance electric machine. The RPT typically includes a sensor board with one or more sensors and a shutter that is coupled to and rotates with the shaft of the rotor. The shutter includes a plurality of shutter teeth that pass through optical sensors as the rotor rotates.

Because rotor position information is critical to proper operation of the switched reluctance electric machine, sophisticated alignment techniques are used to ensure that the sensor board of the RPT is properly positioned with respect to the housing and the stator. Misalignment of the sensor board is known to degrade the performance of the electric machine. Unfortunately, utilization of these complex alignment techniques increases the manufacturing costs for switched reluctance electric machines equipped with RPTs.

The RPTs also increase the overall size of the switched reluctance electric machine, which can adversely impact machine and product packaging requirements. The costs of the RPTs often place switched reluctance electric machines at a competitive disadvantage in applications that are suitable for open-loop induction electric machines that do not require RPTs.

Another drawback with RPTs involves field servicing of the switched reluctance electric machines. Specifically, wear elements, such as the bearings, that are located within the enclosed rotor housing may need to be repaired or replaced. To reach the wear elements, an end shield must be removed from the housing. Because alignment of the sensor board is important, replacement of the end shield often requires the use of complex realignment techniques. When the service technician improperly performs the alignment techniques, the sensor board is misaligned and the motor's performance is adversely impacted.

When sensing the angular rotor position using the "sensorless" approach, variations in the electrical characteristics of the individual stator pole windings can adversely impact the ability of the sensorless drive circuits to correctly derive the angular rotor position. Most of the sensorless approaches measure the resistance and/or inductance of the windings. If the resistance and/or inductance varies from one stator winding to another, the drive circuit may incorrectly determine the angular rotor position.

There are several conventional methods for placing the winding wire on the stator of a switched reluctance electric machine. The winding wire can be initially wound and transferred onto the stator poles. Transfer winding tends to leave excess winding wire or loops around axial ends of the stator poles. Transfer winding can typically utilize approximately 60–65% of available stator slot area. Needle winding employs a needle that winds the wire directly on the stator poles. The needle, however, takes up some of the stator slot area, which reduces slot fill to approximately 50%. The positioning of winding wire on the stator poles using these methods varies from one stator pole to the next. Winding creep and other assembly variations also impact the inductance and resistance of the winding wire over time, which makes it difficult to accurately perform "sensorless" control due to the non-conformity of the salient stator poles.

It is difficult to hold the winding wire in place during wrapping and forming of the windings. This is particularly true for salient stator poles of reluctance machines that typically have teeth with parallel sides that do not hold the winding wire very well. Tangs or circumferential projections have been used on the radially inner ends of the salient stator poles to provide a stop surface to retain the winding wire in place. The tangs limit a slot opening dimension between adjacent salient poles. As the size of the tangs increases, the ability of the tangs to retain the winding wire improves. However, as the size of the tangs increases and the slot opening dimension decreases, it becomes more difficult or impossible to employ the conventional needle and transfer winding methods. Widening of the tangs may also compromise performance. In addition to retaining the winding wire, there are other electrical reasons for widening the tangs, which would be precluded by these winding methods.

When using needle and transfer winding methods, the position of winding wire on the stator poles varies from one stator pole to the next and from one electric machine to the next. In other words, the individual winding turns are positioned differently and the cross sectional pattern of the stator pole windings is different. As a result, the inductance and resistance of the stator pole windings often vary from one stator pole to the next even though the same number of winding turns are used.

While the design of switched reluctance electric machines is relatively mature, there are several areas requiring improvement. Specifically, it is desirable to improve the torque density of switched reluctance electric machines. By increasing the torque density, the size of the switched reluctance electric machine can be reduced for a given torque output and/or the size can be maintained with an increase in torque output. Electrical machines achieving higher torque density will allow designers of products equipped with switched reluctance electrical machines greater flexibility in product design that may lead to increased sales through product differentiation and/or improved profit margins.

It is also desirable to eliminate the need for RPTs in switched reluctance electric machines. It is also desirable to assemble the stator of a switched reluctance electric machine in a highly uniform and repeatable manner to improve the performance of sensorless switched reluctance motors by reducing variations in the inductance and resistance of the stator.

SUMMARY OF THE INVENTION

A switched reluctance machine according to the invention includes a rotor and a segmented stator having a plurality of stator segment assemblies. The stator segment assemblies define salient stator poles and inter-polar stator slots. Each of the stator segment assemblies includes a stator segment core, an end cap assembly attached to opposite axial end surfaces of the stator segment core, and winding wire that is wound around the stator segment core and the end cap assembly. The rotor defines a plurality of rotor poles. The rotor tends to rotate relative to the stator to maximize the inductance of an energized winding. A drive circuit energizes the winding wire around the stator segment assemblies based on the rotational position of the rotor.

According to other features of the invention, each stator plate has an outer rim section and a tooth section. The end cap assembly includes a pair of end caps that are secured to opposite ends of the stator segment core, and a pair of retainer plates interconnecting the end caps on opposite sides of the stator segment core. The end cap assembly defines an annular retention channel within which the winding wire is wound. The retention channel facilitates improved precision in the winding process and tends to reduce winding creep during use.

By providing a segmented stator, the present invention improves the torque density of the switched reluctance electric machine. As a result, the torque output of the switched reluctance electric machine can be increased and/or the dimensions of the switched reluctance electric machine can be reduced for a given torque output. In addition, the stator segment assemblies can be manufactured with a greater uniformity and with lower variations in inductance and resistance. Sensorless rotor position sensing techniques can be employed to dramatically lower the manufacturing costs of the switched reluctance machine and to improve reliability in the field.

Other objects, features and advantages will be apparent from the specification, the claims and the drawings.

BRIEF DESCRIPTION OF THE DRAWINGS

FIG. 2A illustrates a stator plate;

FIG 2C illustrates central portions that are deformed in a die punch operation and that are used to releasably engage adjacent stator plates;

FIG. 3 is a perspective view of a stator segment assembly associated with the stator;

FIG. 4 illustrates a switched reluctance drive circuit and a circuit board for connecting the drive circuit to terminals of the stator segment assemblies;

FIG. 6A is similar to FIG. 5A except that an alternate end cap assembly is shown;

FIG. 6B shows a plan view of the alternate end cap assembly of FIG. 6A; and

FIG. 6C illustrates an end view of the alternate end cap assembly shown in FIG. 6B.

DETAILED DESCRIPTION OF THE PREFERRED EMBODIMENTS

Figure 1:
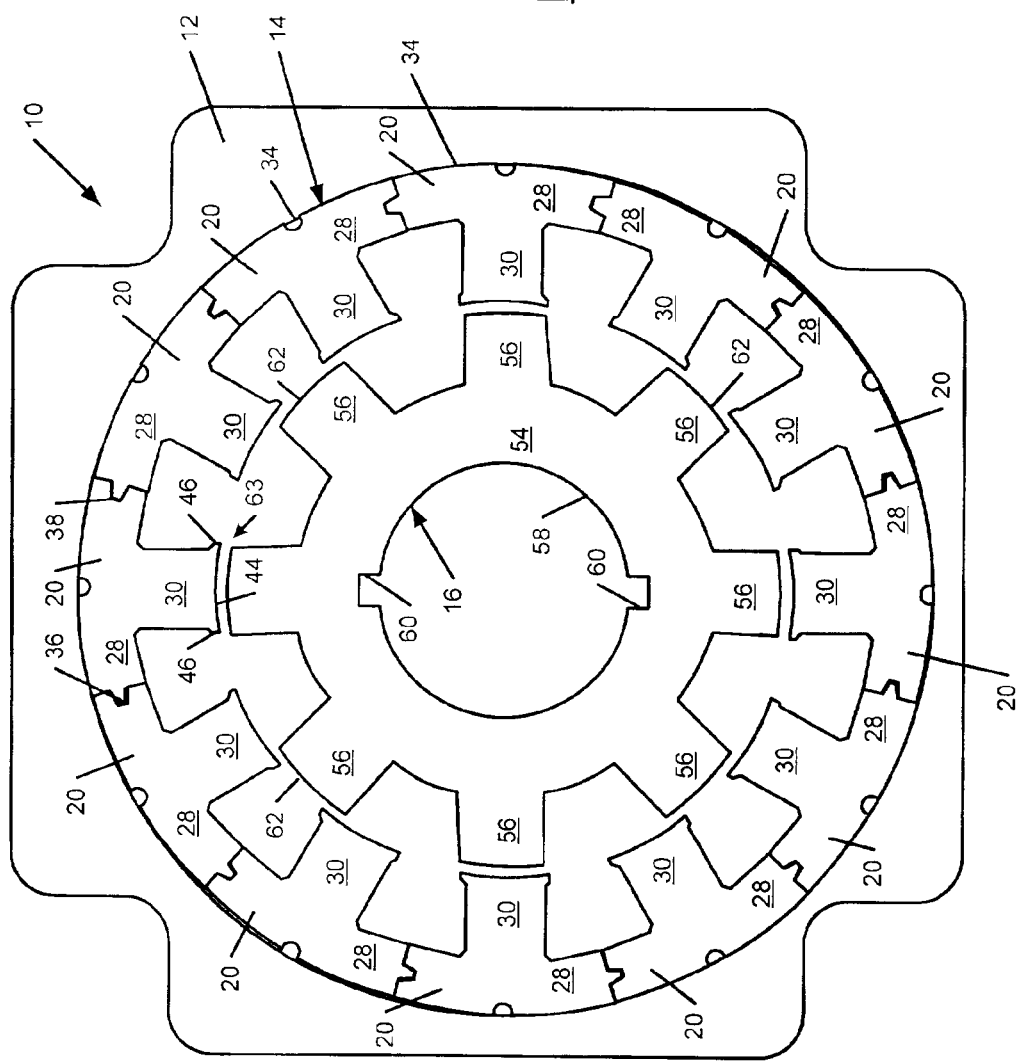
FIG. 1 illustrates a segmented stator and a rotor for a switched reluctance electric machine.

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

Referring now to the drawings, a switched reluctance machine 10 is shown to include a housing 12, a segmented stator 14 mounted in the housing 12, and a rotor 16 supported for rotation relative to the segmented stator 14. In accordance with the present invention, the segmented stator 14 includes a plurality of stator segment assemblies 18 that can be individually assembled and then combined with additional stator segment assemblies to provide the segmented stator 14. As will be detailed, each stator segment assembly 18 includes a stator segment core 20, an end cap assembly 22 supporting the stator segment core 20, and winding wire 24 that is wound around the stator segment core 20 and the end cap assembly 22.

Figure 2B:
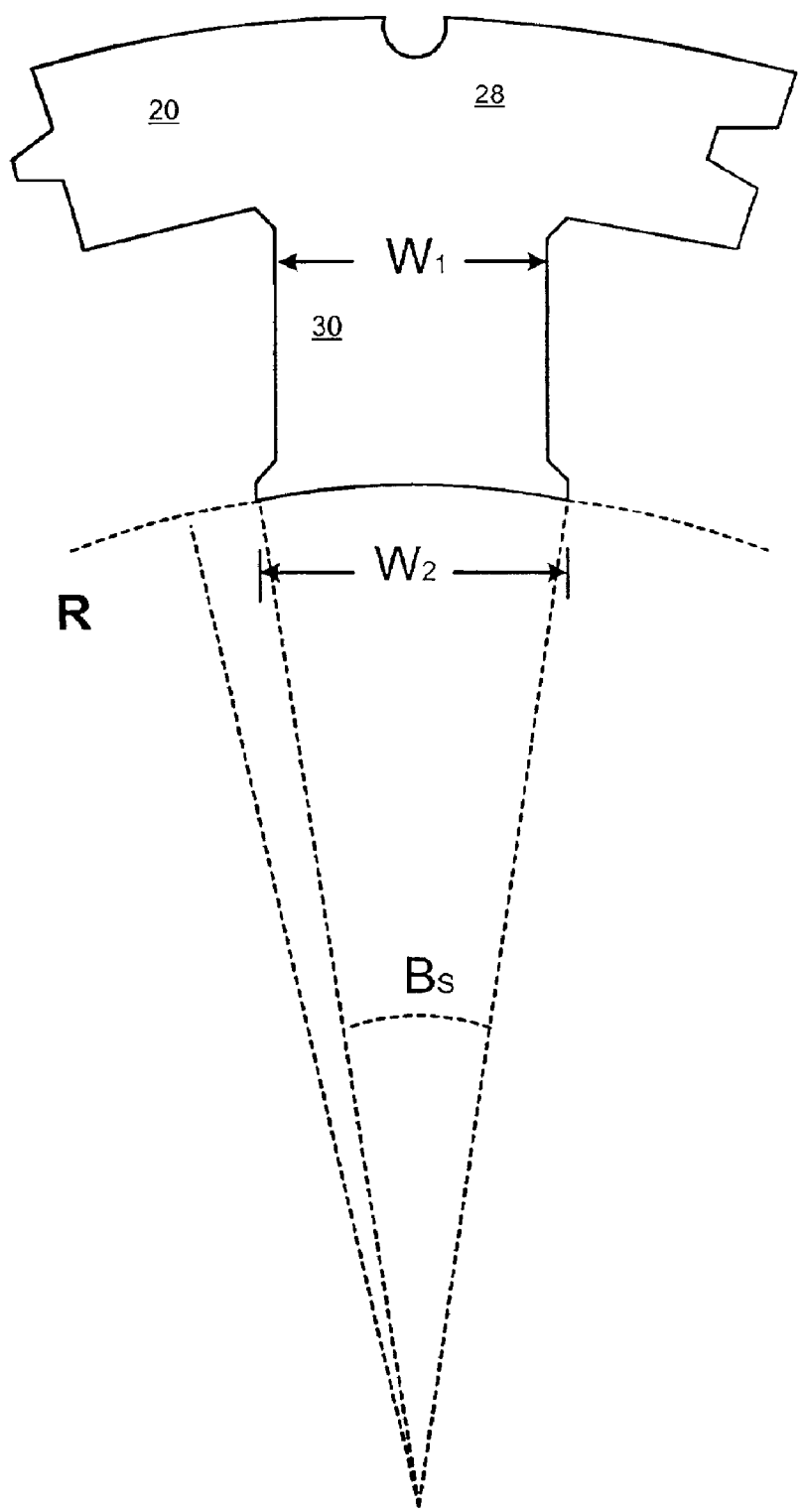
FIG. 2B identifies tooth width, projection width and stator pole arc on the stator plate of FIG. 2A.

Referring to FIGS. 1, 2A and 2B, the stator segment core 20 includes a solid core or a stack of individual stator plates 26. Each stator plate 26 includes an arcuate outer rim section 28 and a tooth-shaped pole section 30. An outer edge surface 32 of the outer rim section 28 is shaped for mounting to an inner wall surface 34 of the housing 12. Each outer rim section 28 has a tongue projection 36 formed on one edge surface 38 and a groove 40 on its opposite edge surface 42. This tongue and groove arrangement helps align the stator segment assemblies during manufacturing. Each pole section 30 of the stator plates 26 has an arcuate inner edge surface 44 and a pair of circumferentially-extending projections 46.

As previously mentioned, the stator segment core 20 is defined by a plurality of stator plates 26 that are stacked together. The stator plates 26 are die cut from thin sheets of magnetically conductive material. During the die cutting operation, a first pair of slits 50 are cut into the outer rim section 28 and a second pair of slits 52 are cut into the pole section 30. The slits 50 are transverse in alignment relative to the slits 52. After stacking the stator plates 26 that form the stator segment core 20, a die punch operation is completed to deform a central portion 53 between the slits 50 and 52. As can be seen in FIG. 2C, the central portions 53 of the stator plates 26 are deformed by the die punch operation. In the example in FIG. 2C, the central portion 53-1 and 53-2 are deformed. The central portion 53-1 of the stator plate 26-1 is deformed into and received between slits of the adjacent stator plate 26-2. As can be appreciated, additional stator plates include a deformed central portion 53 that is received by slits 50 or 52 of an adjacent stator plate 26. This operation results in the stator plates 26 being releasably interconnected to define the stator segment core 20.

The rotor 16 is shown to include a circular rim section 54 and a plurality of tooth-shaped pole sections 56 that project radially from the rim section 54. A circular bore 58 is formed in the rotor 16 and includes keyways 60. The circular bore 58 of the rotor 16 receives a rotor shaft (not shown). In the particular embodiment shown, the rotor 16 has eight equally spaced rotor pole sections 56 and the segmented stator 14 has twelve equally spaced pole sections 30. Other rotor pole and stator pole combinations are also contemplated. In addition, each rotor pole section 56 has an arcuate outer edge surface 62 that defines an air gap 63 with respect to the arcuate inner edge surface 44 on the pole sections 30 of the stator plates 26.

Referring to FIG. 2B, tooth width W1, projection width W2, and stator pole arc Bs are shown. As a result of segmenting the stator, the designer of the switched reluctance electric machine has greater flexibility in designing the dimensions of the stator segment assemblies. The slot opening dimension between radially inner ends of the stator teeth restricts the projection width W2 when needle and transfer winding methods are employed. This restriction is eliminated when the segmented stator assemblies are employed because the stator teeth can be wound individually before being assembled into the stator.

The tooth width W1 determines the magnetic flux density in the stator tooth and how much area is available for winding wire in the inter-polar stator slot. The designer of the switched reluctance electric machine can select the tooth width W1 so that it is sufficient to accommodate the maximum anticipated magnetic flux in the stator poles, but is not wider than necessary. By optimizing the tooth width W1, the slot area is increased, which allows additional winding wire. By increasing the current carrying capacity of the windings without causing overheating, the torque density of the switched reluctance electric machine can be improved. The design of the stator plates also depends on the type of steel that is selected, the axial length of the stator stack, and the desired magnetic flux density in the stator teeth.

Referring to FIG. 3, the stator segment assembly 18 is shown fully assembled to include the stator segment core 20, the end cap assembly 22 and the winding wire 24. The end cap assembly 22 is preferably made from magnetically permeable material and includes a first end cap 64A, a second end cap 64B and a pair of elongated winding retainer sections 66A and 66B, which are collectively referred to as retainers 66. The first end cap 64A is located at one end of the stator segment core 20 and the second end cap 64B is located at the opposite end of the stator segment core 20. The winding retainer sections 66 interconnect the first and second end caps 64A and 64B and are located adjacent to the projections 46 near the radially inner end of the pole sections 30 of the stator plates 26. Preferably, the end caps 64A and 64B are similar in configuration. Likewise, it is preferable that the retainer sections 66 are similar in configuration. Snap-in connections are contemplated for connecting the opposite ends of each retainer section 66 to the end caps 64A and 64B. Additionally, it is contemplated that adhesives are used for bonding the end caps 64A and 648 to the opposite ends of the stator segment core 20. The end caps 64A and 646 and the retainer sections 66 can also be molded as an integral end cap assembly 22. The first end cap 64A is similar to the second end cap 64B. The following description of the components will use reference numerals with an "A" suffix for the first end cap 64A and with a "B" suffix for the second end cap 64B.

Referring to FIG. 4, a switched reluctance drive circuit 80 is shown connected via connecting wires 82, 84 and 86 to a printed circuit board 88. The printed circuit board 88 is circular and has a plurality of radially outwardly projecting terminal pads 90. Each terminal pad 90 has conductive terminal slots 92 and 94 arranged to accept installation of the terminals 70 and 72 for each stator segment assembly 18. The drive circuit 80 operates to control energization of the winding wire 24 of the stator segment assemblies 18.

Figure 5A:
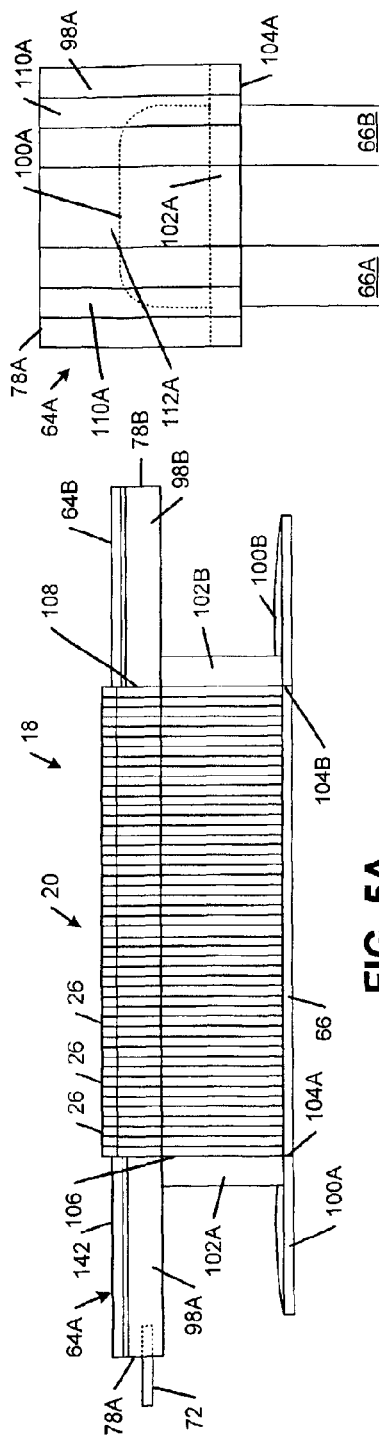
FIG. 5A shows the stator segment assembly with its wire windings and insulation removed to better illustrate a stack of stator plates and the end cap assembly.

To more clearly illustrate the structure of the end cap assembly 22, FIG. 5A shows the stator segment assembly 18 prior to the winding wire 24 being wound thereon. The first end cap 64A includes an outer section 98A and an inner section 100A interconnected by a hub section 102A, all defining a common face surface 104A. The face surface 104A abuts and is bonded to an end surface 106 of the stator segment core 20. Similarly, the face surface 104B of second end cap 64B abuts and is bonded to an end surface 108 of the stator segment core 20. When the first end cap 64A is secured to the stator segment core 20, its outer section 98A is connected slightly radially inward with respect to the outer rim section 28 and is parallel to the outer rim section 28. The hub section 102A is aligned with pole section 30 and the inner section 100A is aligned with and extends laterally beyond the inner edge surface 44 and the projections 46. A similar alignment is provided when the second end cap 64B is secured to the opposite end surface 108 of the stator segment core 20. Moreover, the width of hub sections 102A and 102B is less than or equal to the width of the pole sections 30 of the stator segment core 20. The opposite ends of the retainer sections 66 are connected to the face surfaces 104A and 104B of the end caps 64A and 64B, respectively, adjacent to their inner sections 100A and 100B. As such, the end cap assembly 22 defines a continuous annular channel within which the winding wire 24 can be precisely installed and maintained.

Figure 5B:
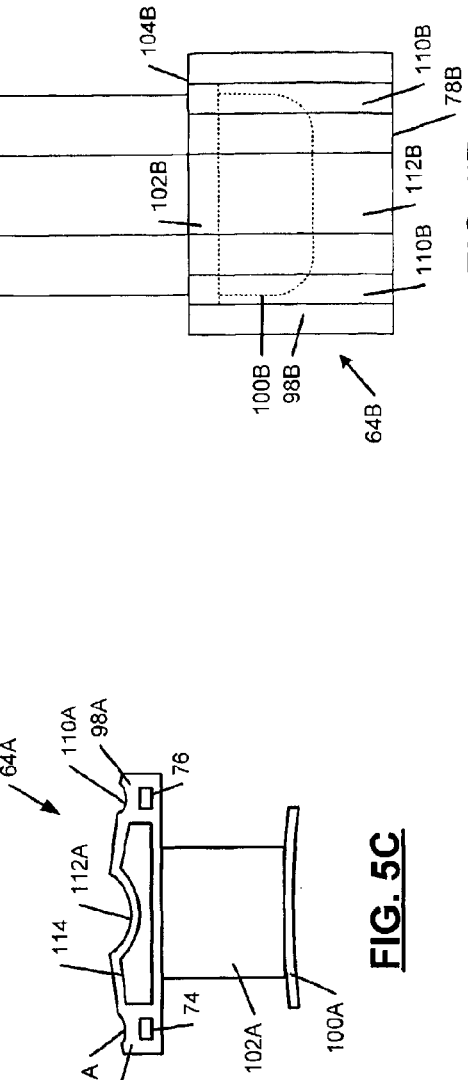
FIG. 5B is a plan view of the end cap assembly shown in FIG. 5A.

FIG. 5B shows the inner section 100A of the first end cap 64A and the inner section 100B of the second end cap 64B to be rectangular in shape. It is contemplated, however, that other configurations (i.e. semi-circular, square, tapered, etc.) could be used. As a further option, the retainer sections 66 could be provided as a cantilevered section that is integrally formed with the end caps 64A and/or 64B and adapted for connection to the inner section of the opposite end cap. To reduce the weight of the end cap assembly 22, lateral axial grooves 110 and a central axial groove 112 can be formed on the outer section of the end caps 64A and 64B. Likewise, a cavity 114 can also be formed to provide additional weight reduction.

Figure 5C:
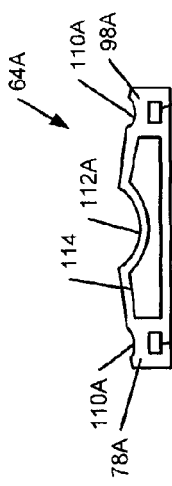
FIG. 5C is an end view of the end cap assembly shown in FIG. 5B.

Referring now to FIGS. 6A, 6B and 6C, an alternative cap assembly 122 is shown for connection to the stator segment core 20 and supporting the winding wire 24. Reference numerals from FIGS. 5A, 5B and 5C will be used where appropriate to identify similar elements. Specifically, the first end cap 124A is generally similar to the first end cap 64A. The alternative end cap assembly 122 includes an additional pair of retainer sections. An outer retainer section 126A extends axially from the common face surface 104A adjacent to the outer section 98A for connection to the outer section 98B of the second end cap 124B. An outer retainer section 126B likewise extends axially from its common face surface 104B for connection to common face surface 104A of first end cap 124A. The outer retainer sections 126A and 126B provide additional support for the end cap assembly 22. In addition, the outer retainer sections 126A and 126B fill an undercut area of the stator segment core 20 and eliminate a sharp edge on the inner wall surface 130 that may scrape the winding wire during the winding operation. The outer retainer sections 126A and 126B have a tapered profile to mate with the profile of inner wall surfaces 130 (FIG. 2) of the outer rim section 28.

As can be appreciated from the foregoing, the segmented stator for a switched reluctance electric machine according to the invention improves the torque density of the electric machine in part by increasing slot fill, by allowing the stator segment assemblies to be precisely wound (which improves heat exchange between the windings and the slot), and by providing a greater active length for a given overall length across end turns (due to shorten end turns).

The stator segment assemblies of the switched reluctance electric machine can be produced with a greater electrical uniformity and with lower variations in inductance and resistance. As a result, sensorless rotor position sensing techniques can be employed, which dramatically lowers the manufacturing costs of the switched reluctance machine and improves reliability in the field. Because the manufacturing tolerances of the stator have been improved, less costly drive circuits can be employed and/or more accurate control can be achieved. In addition, the end cap assemblies according to the invention prevent winding creep and further help to improve the electrical uniformity of the stator segment assemblies during use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A switched reluctance machine comprising:
   a stator including a plurality of circumferentlally-spaced stator segment assemblies with a stator segment core and winding wire wound around said stator segment core that has slot fill that is greater than 65%;
   a rotor defining a plurality of rotor poles, wherein said rotor tends to rotate relative to said stator to maximize the inductance of an energized winding; and
   a drive circuit that energizes said winding wire around said stator segment assemblies to control operation of said switched reluctance machine based on a rotational position of said rotor; the stator segment core including a stack of stator plates;
   and the stator plates including a radially outer rim section;
   and a tooth section that extends radially inwardly from a center portion of said radially outer rim section;
   and projection extending from opposite sides of a radially inner end of said tooth section;
   and a first and second end caps connected to opposite face surfaces of said stator segment core; and
   first and second end cap retainer sections that extend along said projections and that connect said first and second end caps,
   wherein said first and second end caps and said first and second end cap retainer sections reduce movement of said winding wire during use.

2. The switched reluctance machine of claim 1 further comprising:
   an insulation layer located between said winding wire and said stator segment core.

3. The switched reluctance machine of claim 1 wherein said stator plates of said stator segment core include radial and lateral slits and first and second central portions that are deformed using a punch to hold said stack of stator plates together.

4. The switched reluctance machine of claim 1 wherein said drive circuit senses rotor position using sensorless techniques.

5. In a switched reluctance machine that includes a stator, a rotor and a machine housing, an improved stator comprising:

a plurality of circumferentlally-spaced stator segment assemblies that are arranged around an inner surface of said machine housing of said switched reluctance machine, each of said stator segment assemblies defining a salient stator pole that extends in a radially inward direction, wherein inter-polar stator slots are defined between adjacent stator segment assemblies, and said stator segment assemblies including a stator segment core and winding wire that is wound around said stator segment core and that has a slot fill that is greater than 65%; projections extending from opposite sides of a radially inner end of said tooth section; and first and second end caps connected to opposite axial ends of said stator segment core; and first and second end cap retainer sections that extend along said projections and that connect said first and second end caps, wherein said first and second end caps and said first and second end cap retainer sections reduce movement of said winding wire during use.

6. The improved stator of claim 5 wherein said stator segment core includes a stack of stator plates.

7. The improved stator of claim 6 wherein each of said stator plates includes:

a radially outer rim section; and a tooth section that extends radially inwardly from a center portion of said radially outer rim section.

8. The improved stator of claim 7 further comprising:

an insulation layer located between said winding wire and said stator segment core.

9. The improved stator of claim 6 wherein said stator plates of said stator segment core include radial and lateral slits and first and second central portions that are deformed to hold said stator segment core together.

10. A switched reluctance machine comprising:

a machine housing;

a rotor that rotates relative to said machine housing of said switched reluctance machine; and a stator that is mounted on an inner surface of said machine housing, said stator including a plurality of circumferentially-spaced stator segment assemblies, wherein said stator segment assemblies include a stack of stator plates forming a stator segment core and winding wire that is wound around said stator segment core and that has a slot fill that is greater than 65%, wherein each of said stator plates has a generally "T"-shaped cross-section, a radially outer rim section, and a tooth section that extends radially inwardly from a center portion of said radially outer rim section; projections extending from opposite sides of a radially inner end of said tooth section; and first and second end caps connected to opposite axial ends of said stator segment core; and first and second end cap retainer sections that extend along said projections and that connect said first and second end caps, wherein said first and second end caps and said first and second axial end cap retainer sections reduce movement of said winding wire during use.

11. The switched reluctance machine of claim 10 further comprising:

an insulation layer located between said winding wire and said stator segment cores.

12. The switched reluctance machine of claim 10 wherein said stator plates of said stator segment core include radial and lateral slits and first and second central portions that are deformed to hold said stator segment core together.

13. The switched reluctance machine of claim 10 further comprising:

a drive circuit connected to said winding wire of said stator segment assemblies, wherein said drive circuit senses rotor position using sensorless rotor techniques.

* * * * *

UNITED STATES PATENT AND TRADEMARK OFFICE
CERTIFICATE OF CORRECTION

PATENT NO. : 7,012,350 B2  
APPLICATION NO. : 09/803876  
DATED : March 14, 2006  
INVENTOR(S) : C. Theodore Peachee et al.

Page 1 of 1

It is certified that error appears in the above-identified patent and that said Letters Patent is hereby corrected as shown below:

Column 1,
Line 3, insert: --RELATED APPLICATIONS This application relates to U.S. Patent Application Serial Nos. 09/817,559, filed March 26, 2001; 09/754,537, filed January 1, 2001; 09/761,125, filed January 16, 2001; 09/824,980, filed April 3, 2001; 09/817,560 filed March 26, 2001; 09/817,687, filed March 26, 2001; and U.S. Patent No. 6,487,769, issued December 3, 2002.--.

Column 6,
Line 60, "648" should be --64B--.
Line 62, "646" should be --64B--.
Line 68, insert: --Terminals 70 and 72 are shown in FIGS. 3 and 5A to be mounted in slots 74 and 76 (FIG. 5C) formed in an end surface 78A of the first end cap 64A. One end of the winding wire 24 is connected to the first terminal 70 while an opposite end of the winding wire 24 is connected to the second terminal 72. Insulating material 77 covers winding wire 24 on both lateral sides of stator core 20. The insulating material 77 is also positioned between the stator segment core 20 and the winding wire 24 as can be seen in Fig. 2A.--.

Column 9,
Line 31, claim 5, after "second", insert --axial--.

Column 10,
Line 27, claim 10, after "second", delete "axial".

Signed and Sealed this
Eighth Day of November, 2011

David J. Kappos
*Director of the United States Patent and Trademark Office*